United States Patent [19]

Sugimura

[11] 3,861,505

[45] Jan. 21, 1975

[54] REEL ASSEMBLY FOR WINDING CABLE MOUNTED ON ELECTRIC EARTHMOVING MACHINE

[75] Inventor: Ryo Sugimura, Tokyo, Japan

[73] Assignee: Caterpillar Mitsubishi Ltd., Tokyo, Japan

[22] Filed: July 30, 1973

[21] Appl. No.: 383,884

[30] Foreign Application Priority Data
July 28, 1972  Japan................. 47-88307

[52] U.S. Cl............................. 191/12.2 R, 242/86.8
[51] Int. Cl............................................... H02g 11/00
[58] Field of Search......... 191/12.2 R, 12.4, 12.2 A; 242/86.5 R, 86.8; 239/198

[56] References Cited
UNITED STATES PATENTS

| | | | |
|---|---|---|---|
| 1,499,426 | 7/1924 | Townsend................. | 191/12.2 A X |
| 2,915,259 | 12/1959 | Force............................ | 191/12.2 R |
| 3,032,291 | 5/1962 | Kendt et al................... | 191/12.2 R |
| 3,258,545 | 6/1966 | Bernard, Jr.................... | 191/12.2 R |
| 3,753,409 | 8/1973 | Frazier........................... | 239/198 X |

*Primary Examiner*—Lloyd L. King
*Assistant Examiner*—Michael Mar
*Attorney, Agent, or Firm*—Phillips, Moore, Weissenberger, Lempio & Strabala

[57] ABSTRACT

A power cable reel assembly for an electrically driven machine is mounted at the rear of the machine close to the ground to avoid additional loads on the assembly caused by the length of cable extending between the assembly and the ground, and also uses a level wind guide system to evenly distribute the cable on the drum assembly as it is wound or unwound therefrom. The drum includes a brush and slip ring arrangement wherein the slip rings rotate with the drum to transmit the power from the cable on the drum through the brushes to the stationary wiring on the tractor, from which the electrical motor thereon is powered.

8 Claims, 8 Drawing Figures

REEL ASSEMBLY FOR WINDING CABLE MOUNTED ON ELECTRIC EARTHMOVING MACHINE

BACKGROUND OF THE INVENTION

The present invention relates to a reel assembly for winding and unwinding a power cable and more particularly to such an assembly mounted on an electrically driven machine such as an earthmoving vehicle employing an electric motor as a prime mover. The power cable is utilized for conducting electricity to the machine for its drive motor and is connected to an electrical power source remote from the machine. As the machine does not maintain a fixed position, but moves around in the progress of work, the control of the power cable raises problems, as it could be easily damaged or cut by the machine if it becomes entangled therewith. In these types of systems, a stationary cable winding apparatus may be located in a position adjacent to the operating area in which the machine is utilized so that the cable winding apparatus can wind or unwind cable as the machine moves about in the operating area. Another approach to the problem of controlling the cable is mounting a reel assembly directly on the machine, which is electrically powered so the cable can be wound or unwound on the drum of the reel assembly in a manner which is consistent with the movement of the machine. In this latter system, the free end of the cable remote from the machine is merely attached to a suitable power source located in the close vicinity of the machine.

Actually, the present invention more particularly relates to improvements in machine mounted reel assemblies for controlling power cables connecting such a machine with a stationary power source. A prior art patent, U.S. Pat. No. 3,632,906 illustrates a vertical reel assembly which is mounted on a vehicle along with associated apparatus to operate the reel assembly. In the structure described in the patent, the cable winding guide associated with the reel assembly is located near the top of the machine. Thus, in such an arrangement, a substantial length of cable will hang from the winding guide on the machine to the ground and will additionally load the reel assembly by an amount equal to the weight of this extended length of power cable. Thus, the reel assembly requires sufficient energy to handle the additional load as well as that necessary to wind and unwind the cable in a manner that it will not be fouled in the earth-engaging members of the vehicles. Further, since the reel assembly must, in most instances, balance the load through some type of clutch arrangement, the additional weight of cable subjects the assembly driving system to additional wear and tear. Also, since the weight of the length of cable between the guide and the ground also loads the guide assembly associated with the reel assembly, the additional length of cable results in shorter service life of both the cable and the guide assembly when the reel assembly is mounted high on the machine.

Another undesirable aspect of mounting a reel assembly a considerable height above the ground is that it decreases the stability of the machine; thus, it is preferable to mount the reel assembly closer to the ground to lower the center of gravity.

Thus, it is a primary object of the present invention to provide an improved machine mounted reel assembly for winding and unwinding electrical power cable in level layers that can be mounted close to the ground to increase the service life of the reel assembly and the cable.

Another object of the present invention is to reduce the size of a machine-mounted reel assembly for power cables by locating the structure horizontally at the rear of the machine.

Still another object of the present invention is to reduce the load on both the winding guide and the reel assembly of a machine-mounted reel assembly by locating the assembly at the rear of the machine relatively close to the ground.

SUMMARY OF THE INVENTION

The above objects can be accomplished according to the present invention by mounting a reel assembly on the rear of an electrically powered machine close to the ground so it is approximately the same height as the machine's undercarriage with the axes of the rotary drum for holding the power cable positioned generally horizontally and a winding guide system having a transverse drive to level wind the cable on the drum, enabling an associated electrical power cable to be wound and unwound off the drum in a manner to reduce the loads thereon. In the above manner, the length of power cable between the guide assembly and the ground is reduced, and wear and tear on both the cable and the reel assembly is also reduced. The power cable on the horizontal drum assembly is connected through rotating slip rings to stationary brushes in order that the power can be transmitted to the stationary wiring on the machine, which is connected to the brushes.

BRIEF DESCRIPTION OF THE DRAWINGS

The instant invention will be better understood by referring to the embodiment thereof shown in the attached drawings wherein.

BRIEF DESCRIPTION OF A PREFERRED EMBODIMENT

Figure 1:
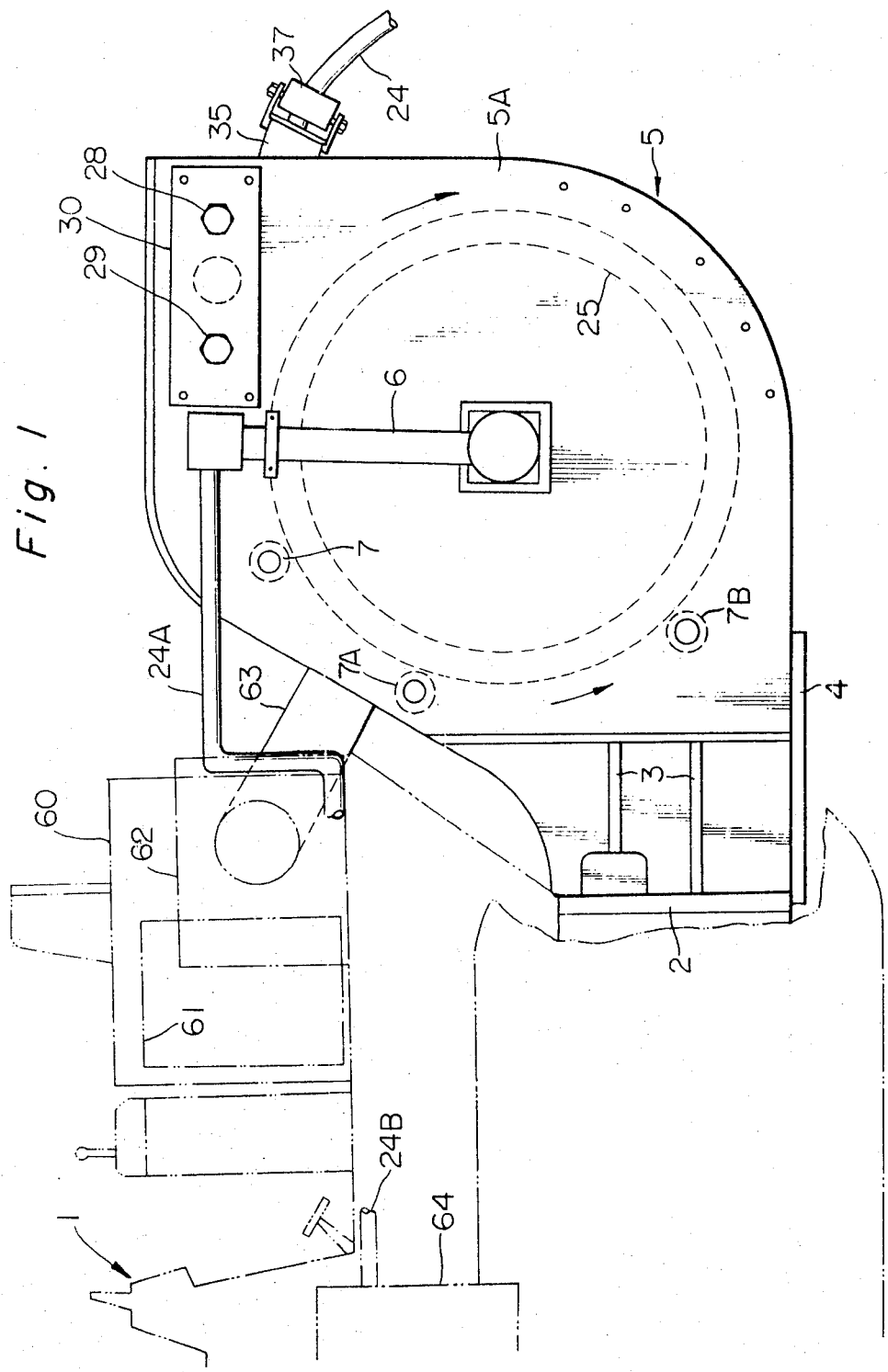
FIG. 1 is an elevation of a reel assembly mounted at the rear of an electrically driven earthmoving machine, the latter being shown by broken lines.
Figure 2:
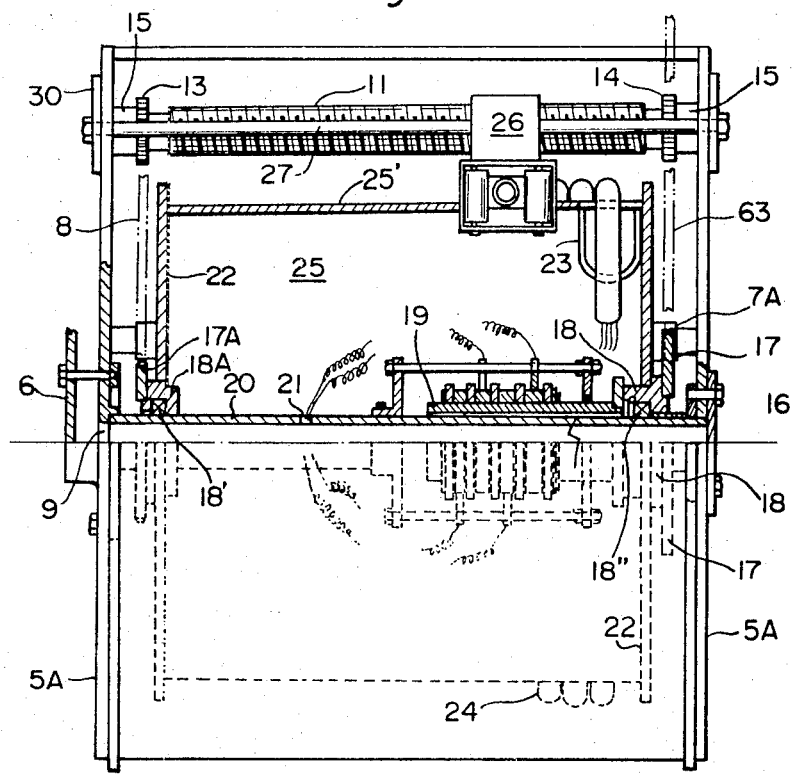
FIG. 2 is an end elevation of the reel assembly with parts thereof shown in vertical section.

In FIGS. 1 and 2 the reel assembly 5 is positioned on the lower part of the rear frame or undercarriage 2 of an electrically driven earthmoving machine 1. Sturdy supports 3 and 4 are bolted or secured directly on the lower rear part of the frame of the machine so that the drum of the reel assembly can be placed between two vertical protecting plates. These spaced-apart plate 5A form the side walls and protective members as well as the bearing mounts for the horizontal drum 25. As can be seen in FIG. 1, an electrical power cable 24 enters the guide assembly 35 located at the rear of the machine, and thereafter passes on to the circumference of the drum 25. The free end of the cable associated with the reel assembly passes into the drum and is connected to the stationary wiring on the machine through a power or speed control device 64 (not shown). The stationary wiring is conducted through conduit 6, which protects the electrical leads that are connected to the stationary portions of the wiring 24A located on the machine.

The basic features of the present invention will be more easily understood if it is recognized that both the construction and mounting location of the reel assembly are chosen to keep it compact and also enable the winding guide 35 to be located adjacent to the ground. This arrangement reduces the torque needed to drive the horizontal drum 25, because the length of cable hanging between the end of the guide and the ground is reduced, thereby reducing the loads by a substantial amount. Also, the orientation of the guide and its location further reduce the loads on the transversing assembly, leading to longer service life for this assembly as well as longer service life for the power cable itself.

It can be appreciated that the power cable coils which are wound on drum 25 rotate with the drum, and therefore, the end of the power cable adjacent to the innermost circumferential surface of the drum must be connected with the stationary wiring of the machine in a manner which allows the cable to rotate with the drum. It is well known that a connection for conducting electricity between a cable coiled on a rotating drum and stationary wiring system can employ slip rings and brushes. In the present invention, the slip rings are mounted in a manner in which they will rotate with the drum while the brushes are fixed on a stationary support shaft that forms the support for the drum itself through appropriate journals. In FIG. 2, the hollow support shaft 20 is best shown and it is oriented horizontally between the side plates 5A that form the protective sides of the reel assembly. Both ends of the shaft 20 are secured in the spaced-apart side plates by means of suitable hubs 16. As indicated previously, a portion of the stationary wiring on the machine 24A passes through conduit 6 and from FIG. 2, it can be seen that it passes through bore 9 at the end of hollow shaft 20, and exits centrally in shaft 20 through an aperture therein. From the aperture in the shaft, the leads of this wiring pass to the brush assembly which is stationary on shaft 20. This arrangement allows the stationary wiring on the machine to be introduced into the cylindrical drum body 25 which is closed at its opposite ends with flanges 22. One of these flanges has an inwardly projecting hollow sleeve 19 that passes over the support shaft when the drum is mounted thereon. Since this sleeve is attached to the flange of the drum body, it rotates therewith. Both flanges include a hub assembly 18, which also includes a bearing 18A that journals the flange on the stationary shaft so that it rotates on the bearing when it is journaled on the shaft. Because of the existence of the sleeve 19, the hub assemblies may differ slightly, with the hub assembly 18A being slightly different from that which holds sleeve 19 on the opposite side. In any case, to these hub assemblies a sprocket 17 is attached, through which the drum can be driven by drive system.

Figure 3:
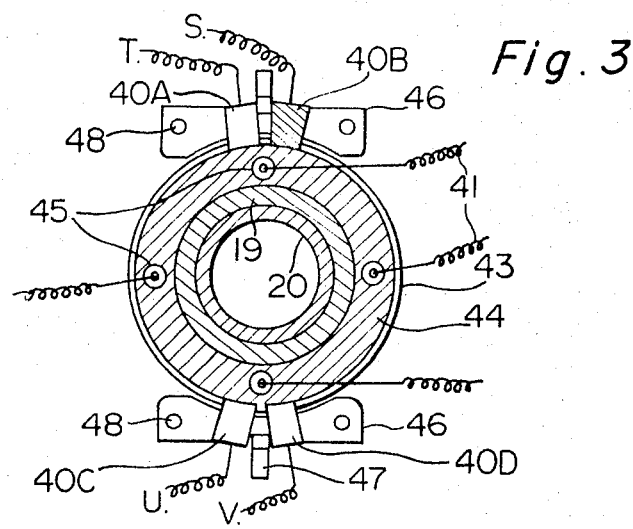
FIG. 3 is an enlarged cross section of the drum supporting shaft taken through the area of the brush and slip ring assemblies.
Figure 4:
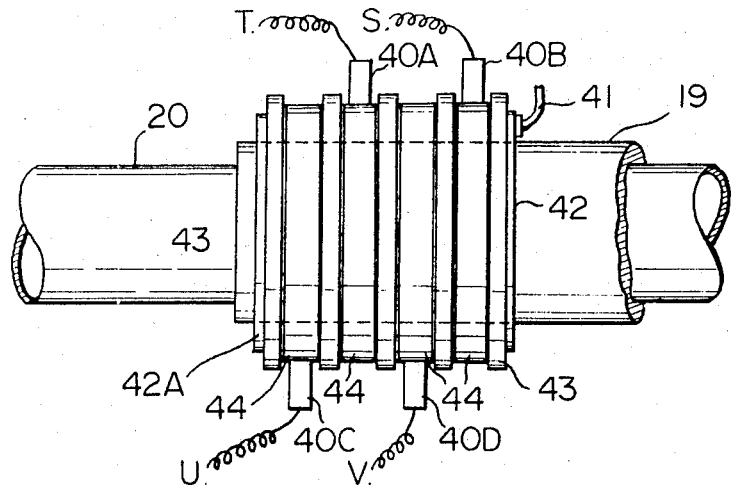
FIG. 4 is a broken-away view of the slip ring and brush assembly better illustrating the electrical interconnections.
Figure 5:
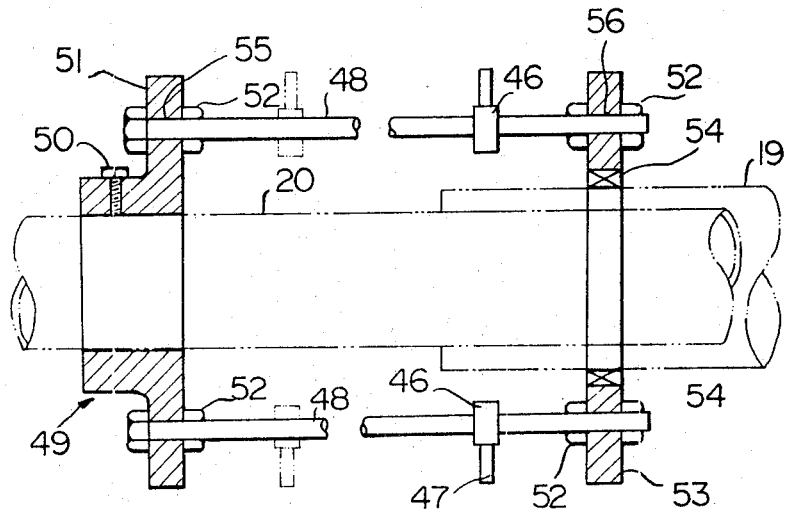
FIG. 5 is a cross-sectional view of the cantilevered brush holder assembly with associated parts shown with broken lines.
Figure 6:
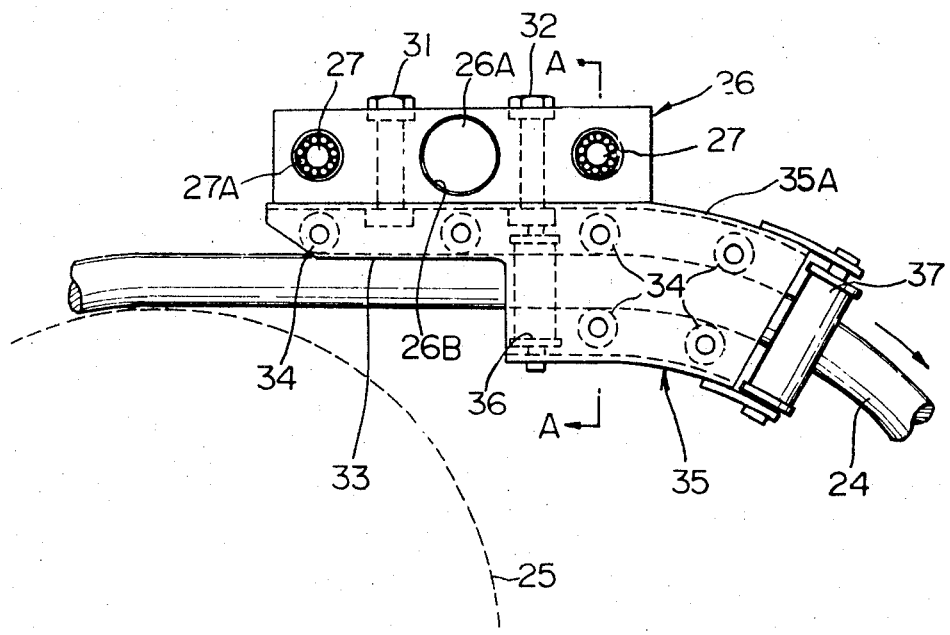
FIG. 6 is an elevation of the guide and transversing assembly which level winds the cable on the drum.
Figure 7:
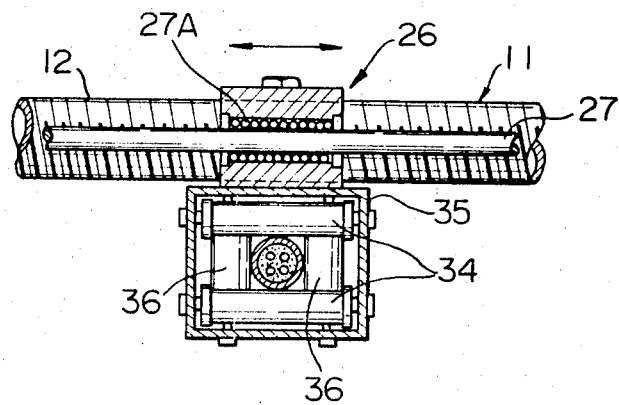
FIG. 7 is a cross section taken along line A—A of FIG. 6.

More particularly, in FIGS. 3, 4 and 5 the brush assembly mentioned above is better shown, and the mounting of the brush holders on stationary shaft 20 can be better seen. Basically, the cantilevered brush holder comprises a flange plate 49 which is secured to the stationary shaft with a set screw and a plurality of cantilevered brush holder bars 48 which connect the flange with a washer plate 53 spaced therefrom. This washer plate includes a bearing 54 which is journaled on sleeve 19 which rotates with the drum. Thus, even though the holder bars are cantilevered, the brush assembly is stabilized by the presence of bearing 54 on sleeve 19. The holder bars 48 are circumferentially positioned about the flange and shaft, and parallel to the shaft, so they are concentric with one another. With the brush holder bars, two brushes can be supported in a stable manner by providing a brush holder device which has two spaced holes therein in which one of the holder bars is received. This arrangement can be best seen in the drawings referenced above. Because the cantilevered brush holder system is attached to the stationary shaft with a set screw 50, it can be appreciated that it will not rotate with the drum. In order to transmit power from the drum, four insulated slip rings 44 are slidably fitted onto the hollow sleeve 19, utilizing insulating members 43. These slip rings are then secured in a manner so that they will not be axially displaced on the sleeve, and also so that they will not rotate relative thereto through the utilization of end plates 42 and 42A. A plurality of apertures or bores 45 pass through the slip ring assembly so that individual wires 41, of which cable 24 is composed, can pass axially through the central portion of the slip ring assembly, as can be seen in FIGS. 3 and 4. Since the slip ring assembly rotates with sleeve 19, that in turn rotates with the drum body 25', the end of the cable does not wrap up on shaft 20, as the cable is wound or unwound.

For convenience, the individual wires of the stationary wiring on the machine and part of cable 24A, are designated respectively T, S, U and V, and are respectively connected to brushes 40A, 40B, 40C and 40D that are held by brush holders or supports 46 that are in turn mounted on the holder bars 48 through the utilization of spaced-apart apertures. Normally the holder 46 will be composed of insulated material so that the individual brushes are insulated from one another without the necessity of using insulated holder bars. Thus with the above-described arrangement, wire T will be connected to brush 40A, wire S will be connected to brush 40B, wire U will be connected to brush 40C and wire V will be connected to brush 40D. Thus as the slip rings rotate relative to the brushes, they will provide a means whereby the individual wires 41 of the power cable 24 on the drum can be connected to separate wires in the stationary wiring on the machine.

Therefore, it will be appreciated that electrical power from an electrical power source will reach the several slip rings 44 through cable 24, whose coils are supported on the drum body, and from these brushes to the individual wires T, S, U and V, that in turn are part of the stationary wiring on the machine. These wires can be recollected in cable form as they pass through conduit 26 and are designated as cables 24A and 24B on the machine.

As can be seen in FIG. 2, the flanges 22 on opposite sides of the rotary drum body 25' prevent the coils of cable on the drum from sliding axially off the outer cylindrical surface of the drum. In order to drive the drum, a hydraulic pump driven by the electric motor, which serves as a prime mover of the vehicle, may be used to drive a hydraulic motor by pressurizing oil in reservoir 60 and delivering it to circuit control device 61, which in turn operates a hydraulic motor device 62. Thus, through this hydraulic drive, the horizontal drum of the reel assembly 5 can be driven by the operating device 62, with drive sprocket 17 mounted on hub 18 via chain 63. The hydraulic motor is controlled in a manner that the cable is either wound or unwound in a manner to keep it from entangling with the ground-engaging elements of the machine.

In order to keep the reel assembly compact, the power cable must be wound thereon in a level manner to utilize the wide horizontal drum surface provided by this device. The level winding is accomplished by a winding guide 35 that is reciprocated horizontally back and forth through a drive device best illustrated in FIGS. 2, 6, 7 and 8. Generally, the guide is carried by a traversing head 26 that is supported on spaced-apart horizontal guide bars 27 through ball bearings 27A, so that the head can slide easily back and forth along the bars. The ends of the bars are supported in turn by the side walls 5A so that the head is maintained a uniform distance above the drum body 25'. Between the ball bearings 27 in the traverser head is an aperture 26A that is threaded so it has a spiral groove 26B. A drive screw 11 is received in the spiral groove and is journaled for rotation in the side walls 5A as can best be seen in FIG. 2. It can be appreciated when the drive screw is rotated, the head will be driven in opposite directions by the intermeshing of the threads in the spiral groove, depending upon the rotation of the drive screw, which is journaled on bearings 15. Mounted on opposite ends of the drive screw 11 are sprockets 13 and 14, respectively, enabling sprocket 13, which is on the same side of the assembly as sprocket 17A, to be connected to the drum 25 through a roller chain 8. In this manner, the timing and direction of the drive screw is synchronized with the rotation of drum 25. If the drum is utilized with only one layer of cable thereon, it can be appreciated that the synchronization will be effective to lay a single layer of cable on the drum in a closely-spaced contiguous manner so that the maximum amount of cable can be loaded on the drum. The other sprocket on the drive screw 11 is connected through chains (not shown) for auxiliary drive of rollers 7, 7A and 7B, which are best shown in FIG. 1. These rollers assist in maintaining the cable about the outer peripheral surface of the drum, and also provide a positive drive for the cable layer as it is wound or unwound from the cable. While it is not absolutely necessary that these auxiliary rollers be driven through a chain drive arrangement associated with sprocket 14, it is desirable. An alternate embodiment would utilize these rollers to confine the cable on the surface of the drum without any driving engagement. Attached to the head 26 of the winding guide 35 is the bent guide structure 35A that supports cable 24 as it is wound or unwound from the drum. This guide structure essentially forms a hollow box having a plurality of guide rollers mounted perpendicularly relative to one another. In particular, a number of horizontally mounted guide rollers 34 guide the cable from the end of the guide assembly under the head of the traverser onto the surface of drum 25. In order that the cable will not move axially relative to the axes of the rollers, vertically disposed rollers 36 and 37 are employed on opposite sides of the cable at opposite ends of the guide. In this manner, the cable is supported by rotating surfaces so that high frictional engagement between the cable 24 and the rollers and/or the guide housing itself are avoided.

Figure 8:
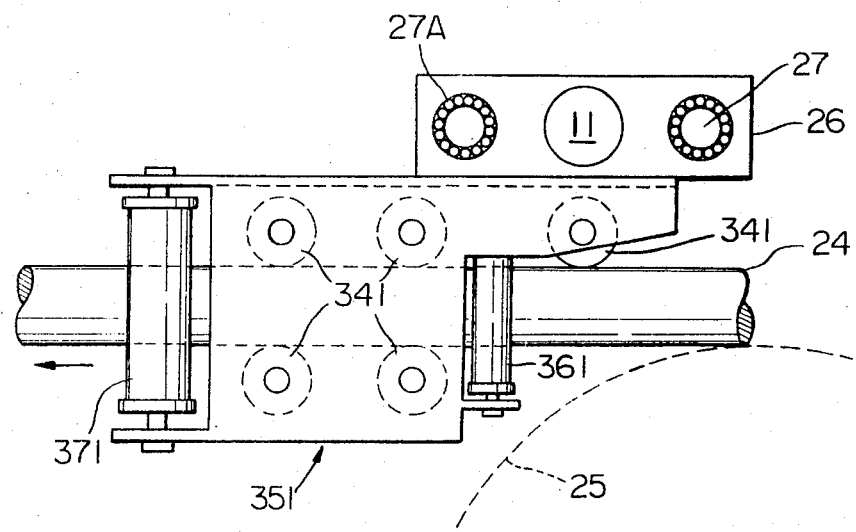
FIG. 8 is a side elevation of a portion of the guide assembly illustrating the passage of the power cable therethrough from the drum of the reel assembly.

FIG. 8 shows another embodiment of the guide structure which does not utilize the downwardly bent or drooped end. Basically, this portion of the guide structure 351 is hollow and includes rollers 341 which are oriented horizontally within the hollow housing. Vertical guide rollers 361 and 371, which are spaced from one another and arranged in pairs so that one is on opposite sides of the cable from the other, function much in the same manner as described above, by limiting movement of the cable axially along guide rollers 341. As far as the traversing motion of the alternate embodiment of the guide structure, it should be appreciated that no change is affected in the head 26 to which it is attached, and thus, the transverse motion is identical for both embodiments.

With reference to the operation of the reel assembly, it is discussed above that it is connected to a hydraulic operating device from motor 62 through a chain 63. By setting the hydraulic motor in a manner that it applies a constant force to the drum which is adequate to wind up cable 24 when slack occurs therein, it can be appreciated through the use of a hydraulic relief valve that as the machine moves away from the source of electrical power that hydraulic oil may be vented, allowing the cable to pay out. Thus, in this manner, the torque on the drum is essentially constant, and of course, is reduced by the fact that a long length of cable trailing from the upper portion of the machine is eliminated by the structure defined. Further, this hydraulic drive arrangement is suitable to quickly wind the cable on the rotary drum 25 when the machine is in reverse operation, thereby eliminating any chance for the cable to foul in the ground-engaging members of the vehicle. Because the guide assembly is connected directly to the rotary drum 25, the timing of the drive screw 11 is assured, and indeed, if the rollers 7 are connected with the appropriate chain, it can be appreciated that all the driving members of the reel assembly work in unison. The aforementioned described drive is extremely functional in that it allows the machine to be maneuvered at will without foulling the cable in the ground-engaging members. Further, it should be appreciated that the operating device 62, which has been described as a hydraulic motor, could be replaced by an electric motor and driven by the remotely located electrical power source. Further, the hydraulic pressure for a hydraulic embodiment need not be provided by the prime mover, but could be provided by a separate electrically-driven pump device.

With the above-described reel assembly, it should be appreciated that it is well protected and can be mounted almost level with the undercarriage of the machine, since the drum can extend the full width of the machine, thereby providing adequate capacity, even without having a large diameter. In this manner, the design is comparatively small when compared to other designs. By use of the transversing guide system, the maximum storage of the cable and the rotary drum is insured, again insuring that the size of the reel assembly is maintained to the absolute minimum. Utilizing the roller assemblies in the guides of the transverser also reduces the cable wear and the loads on the screw drive in the transverser assembly. In addition, the reel assembly, due to its rear mount, is usually adapted to a number of electrically driven machines without substantial modification thereto, making the structure more desirable.

What is claimed is:

1. A reel assembly for winding an electrical cable onto and off of an earthmoving machine wherein the reel assembly comprises:
   a rotary drum horizontally mounted in a frame positioned at the rear lower portion of the earthmoving vehicle, said rotary drum including connecting means therein for communicating electrical energy between a cable on said rotary drum and said earthmoving vehicle;
   a cable winding port positioned above said rotary drum and receiving said cable therethrough, said cable winding port having a plurality of vertically arranged rollers on both sides of said port and also having a plurality of horizontally arranged rollers on the top and bottom of said port; an
   a transverse head supporting said cable winding port operable to reciprocate said cable winding port horizontally above said rotary drum to guide said cable onto and off of said drum in a controlled manner.

2. A reel assembly as set forth in claim 1 in which the rotary drum is rotated with a drive device mounted on the earthmoving machine and the rotary drum has an end plate on one side of said drum which is rotatably supported on a stationary hollow shaft passing through the central portion thereof and another side plate on the other side of the drum which is secured to a hollow shaft telescoped onto said stationary hollow shaft so that the former is caused to rotate relative to the latter with the rotation of said drum.

3. A reel assembly as set forth in claim 2 in which lead wires from the earthmoving machine positioned in the stationary hollow shaft extend therefrom within the drum and the connecting means includes brushes which are mounted in the drum and supported with a brush holder on one of said shafts which cooperate with a plurality of slip rings which are mounted on the other of said shafts, said brushes and slip rings operable to connect said lead wires through said brushes and slip rings to the cable on the rotary drum.

4. A reel assembly as set forth in claim 2 in which the transverse head has a threaded guide which is in mesh with a threaded drive for the transverse head so the guide reciprocates horizontally with the regular turn or reverse of the drive device driving the rotary drum thereby timing the movement of the control port with the rotation of said rotary drum.

5. A vehicle-mounted reel assembly for controlling the power supply cable of an electrically driven machine comprising:
   a mounting housing adapted to be connected to the lower rear portion of the machine, including two spaced-apart vertical side walls;
   a horizontal cable drum disposed between said vertical side walls, said drum being journaled for rotation on a horizontal shaft extending between and connected to said side walls;
   drive means connected to said cable drum operable to apply a constant torque thereon to rotate it in one direction; and
   level wind guide means mounted adjacent to said drum and arranged to reciprocate horizontally on an axis parallel to the horizontal axis of said horizontal shaft, said level windings having a drive screw drivingly connected to said drum so that it is accurately timed therewith, and also a cable guide means for carrying a cable winding or unwinding from said drum.

6. The vehicle-mounted reel assembly defined in claim 5 wherein the cable guide means includes both vertical and horizontal sets of spaced rollers designed to guide the cable onto and off of the horizontal drum.

7. The vehicle-mounted reel assembly defined in claim 6 wherein a plurality of additional rollers are mounted about the periphery of the horizontal drum and spaced therefrom so the cable wound on the drum is confined between said rollers and said drum, said rollers being drivingly connected to the drive screw of the level drive means, whereby their rotation is timed therewith.

8. The vehicle-mounted reel assembly defined in claim 5 wherein the horizontal drum includes an inwardly projecting sleeve with a plurality of insulated slip rings mounted thereon so said slip rings rotate with said drum and the horizontal shaft mounting the drum includes a brush assembly operable to engage a plurality of brushes with said slip rings, whereby the individual wires of the cable on the drum can be connected with corresponding wires on the machine through the slip ring and brush assembly.

* * * * *